(12) United States Patent
Zhuo et al.

(10) Patent No.: US 11,436,999 B2
(45) Date of Patent: Sep. 6, 2022

(54) DISPLAY DEVICE FOR INJECTION MOLDING MACHINE

(71) Applicant: FANUC CORPORATION, Yamanashi (JP)

(72) Inventors: Xinmin Zhuo, Yamanashi-ken (JP); Junpei Maruyama, Yamanashi-ken (JP); Masaya Tajika, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/070,441

(22) Filed: Oct. 14, 2020

(65) Prior Publication Data

US 2021/0118407 A1 Apr. 22, 2021

(30) Foreign Application Priority Data

Oct. 17, 2019 (JP) .............................. JP2019-189860

(51) Int. Cl.
*G09G 5/14* (2006.01)
*B29C 45/17* (2006.01)
*B29C 45/76* (2006.01)

(52) U.S. Cl.
CPC ........... *G09G 5/14* (2013.01); *B29C 45/1774* (2013.01); *B29C 45/76* (2013.01); *B29C 2045/7606* (2013.01); *G09G 2320/0606* (2013.01); *G09G 2340/045* (2013.01); *G09G 2354/00* (2013.01)

(58) Field of Classification Search
CPC ........................... G09G 5/14; G09G 2340/045
See application file for complete search history.

(56) References Cited

U.S. PATENT DOCUMENTS

| 2003/0078077 | A1 | 4/2003 | Kokubo |
| 2006/0235568 | A1 | 10/2006 | Araki et al. |
| 2013/0100032 | A1 | 4/2013 | Miyazaki et al. |
| 2016/0082504 | A1* | 3/2016 | Okochi ................. B22D 17/32 164/150.1 |
| 2016/0210769 | A1* | 7/2016 | Suryanarayana ......... G06T 3/40 |
| 2018/0293042 | A1* | 10/2018 | Wang .................... G06F 3/1423 |
| 2020/0151252 | A1* | 5/2020 | Guo ....................... G06F 40/18 |

FOREIGN PATENT DOCUMENTS

| JP | 2003-125041 A | 4/2003 |
| JP | 2003-181875 A | 7/2003 |
| JP | 2006-297671 A | 11/2006 |
| JP | 5421973 B2 | 2/2014 |
| JP | 6017029 B2 | 10/2016 |
| JP | 2017-167865 A | 9/2017 |

* cited by examiner

*Primary Examiner* — Samantha (Yuehan) Wang
(74) *Attorney, Agent, or Firm* — Robert P. Michal, Esq.; Carter, DeLuca & Farrell LLP

(57) ABSTRACT

A display device for an injection molding machine is a display device for an injection molding machine configured to control a display on a display unit, wherein, on the display unit, a plurality of display areas are provided beforehand by dividing a display screen into upper, lower, left, and right sections, the display device including a first display control unit configured to display content in any one of the plurality of display areas, without combining the plurality of display areas, and a second display control unit configured to display content in a combined area configured by combining a plurality of display areas that lie adjacent to each other.

9 Claims, 15 Drawing Sheets

FIG. 3A

| CONTENT | NON-COMBINED DISPLAY MODE |
|---|---|
| X1 | Y1 |
| X2 | Y2 |
| X3 | Y3 |
| X4 | Y4 |
| ⋮ | ⋮ |

| CONTENT | COMBINED DISPLAY MODE |
|---|---|
| X5 | Z1 |
| X6 | Z2 |
| X7 | Z3 |
| X8 | Z4 |
| ⋮ | ⋮ |

138B

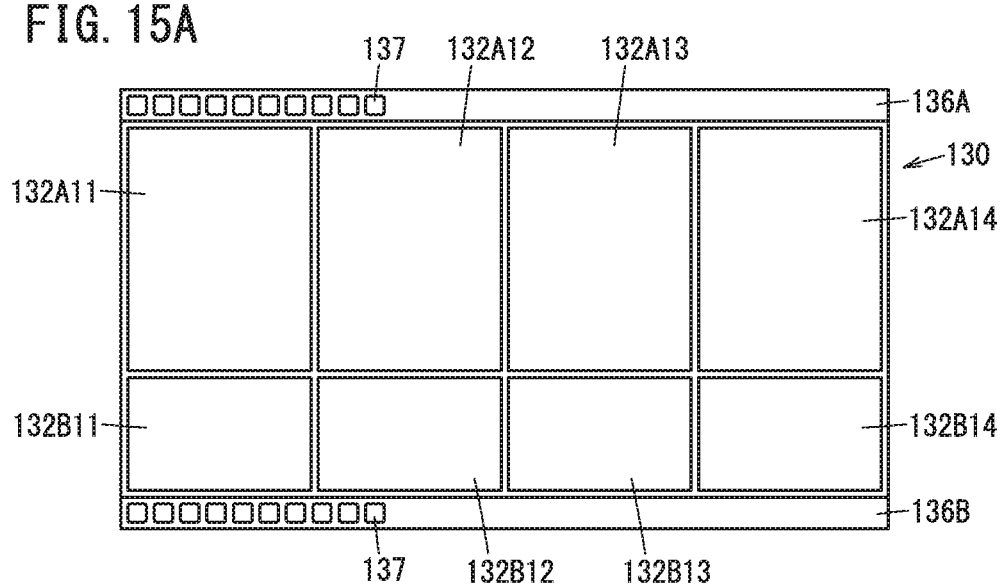
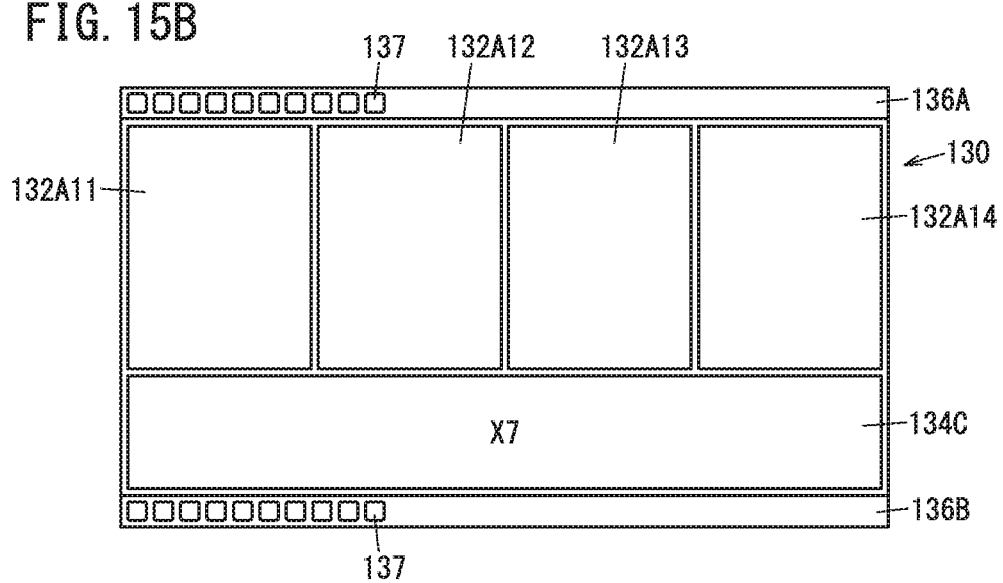

DISPLAY DEVICE FOR INJECTION MOLDING MACHINE

CROSS-REFERENCE TO RELATED APPLICATION

This application is based upon and claims the benefit of priority from Japanese Patent Application No. 2019-189860 filed on Oct. 17, 2019, the contents of which are incorporated herein by reference.

BACKGROUND OF THE INVENTION

Field of the Invention

The present invention relates to a display device for an injection molding machine.

Description of the Related Art

Japanese Laid-Open Patent Publication No. 2006-297671 discloses a display control device comprising a first display mode in which only a selected main screen is displayed, a second display mode in which one selected main screen and one or more selected sub-screens are displayed, and a third mode in which a plurality of selected main screens are displayed.

SUMMARY OF THE INVENTION

However, the display control device disclosed in Japanese Laid-Open Patent Publication No. 2006-297671 cannot necessarily realize a satisfactory display in accordance with the content to be displayed.

An object of the present invention is to provide a display device for an injection molding machine which is capable of realizing a satisfactory display in accordance with the content to be displayed.

A display device for an injection molding machine according to one aspect of the present invention is a display device for an injection molding machine configured to control a display on a display unit, wherein, on the display unit, a plurality of display areas are provided beforehand by dividing a display screen into upper, lower, left, and right sections, the display device comprising a first display control unit configured to display content in any one of the plurality of display areas, without combining the plurality of display areas, and a second display control unit configured to display content in a combined area configured by combining a plurality of display areas that lie adjacent to each other.

According to the present invention, it is possible to provide a display device for an injection molding machine which is capable of realizing a satisfactory display in accordance with the content to be displayed.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3A and FIG. 3B are diagrams showing examples of tables;
FIG. 15A and FIG. 15B are diagrams showing examples of displays.

DESCRIPTION OF THE PREFERRED EMBODIMENTS

A preferred embodiment of a display device for an injection molding machine according to the present invention will be presented and described in detail below with reference to the accompanying drawings.

Embodiment

Figure 1:
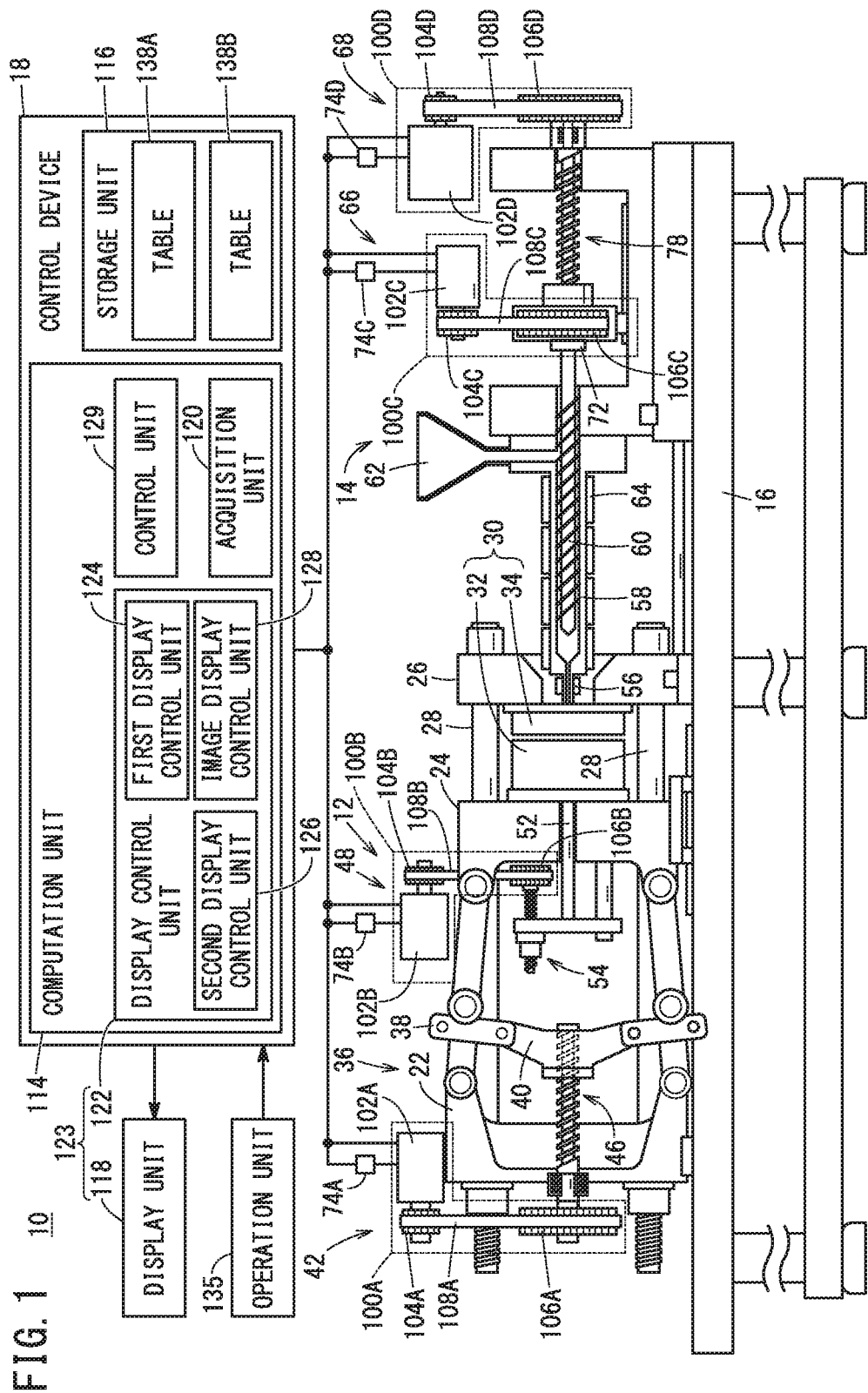
FIG. 1 is a schematic diagram showing an injection molding machine according to an embodiment of the present invention.

An injection molding machine according to one embodiment will be described with reference to FIGS. 1 to 13B. FIG. 1 is a schematic diagram showing an injection molding machine according to the present embodiment.

An injection molding machine 10 is equipped with a clamping device 12 and an injection device 14. The clamping device 12 and the injection device 14 are installed on a base 16. The injection molding machine 10 is further equipped with a control device 18 that controls the clamping device 12 and the injection device 14. The injection molding machine 10 is further equipped with a display unit (a display) 118 and an operation unit 135.

The clamping device 12 includes a rear platen 22, a moving platen 24, and a stationary platen 26. The moving platen 24 is capable of moving forward and rearward along a tie bar 28 provided between the rear platen 22 and the stationary platen 26.

A mold 30 is provided between the moving platen 24 and the stationary platen 26. The mold 30 is equipped with a movable mold 32 and a fixed mold 34. The movable mold 32 is attached to the moving platen 24. The fixed mold 34 is attached to the stationary platen 26.

A toggle link 36 is provided between the rear platen 22 and the moving platen 24. The toggle link 36 is connected to a crosshead 40 via a crosslink 38.

The clamping device 12 is further provided with a clamp open/close mechanism 42. The clamp open/close mechanism 42 is capable of moving the moving platen 24 forward and rearward with respect to the stationary platen 26. The clamp open/close mechanism 42 is equipped with a power transmission device 100A. The power transmission device 100A comprises a drive source (clamp open/close motor) 102A, a pulley (driving pulley) 104A, a pulley (driven pulley) 106A, and a belt 108A. Reference numeral 100 is used to describe power transmission devices in general, and reference numerals 100A to 100D are used to describe the individual power transmission devices. Reference numeral 102 is used to describe drive sources in general, and reference numerals 102A to 102D are used to describe the individual drive sources. Reference numerals 104 and 106 are used to describe pulleys in general, and reference numerals 104A to 104D and 106A to 106D are used to describe the individual pulleys. Reference numeral 108 is used to describe belts in general, and reference numerals 108A to 108D are used to describe the individual belts. The belt 108A is wound around the pulley 104A and the pulley 106A, and transmits a rotational force of the pulley 104A to the pulley 106A. Driving of the drive source 102A can be controlled by the control device 18.

Rotational movement of the drive source 102A is transmitted to a ball screw mechanism 46 that is connected to the crosshead 40. The rotational movement transmitted from the drive source 102A is converted by the ball screw mechanism 46 into movement in a forward/rearward direction of the crosshead 40. Movement of the crosshead 40 in the forward/rearward direction is transmitted to the moving platen 24 via the toggle link 36. In this manner, the moving platen 24 can be moved forward and rearward with respect to the stationary platen 26.

An information acquisition unit 74A is connected to the drive source 102A. A signal corresponding to the torque of the drive source 102A, and more specifically, for example, a signal indicative of a magnitude of the current supplied to the drive source 102A, is input to the information acquisition unit 74A. The information acquisition unit 74A supplies the information indicative of the torque of the drive source 102A to the control device 18. Reference numeral 74 is used to describe information acquisition units in general, and reference numerals 74A to 74D are used to describe the individual information acquisition units.

The clamping device 12 is equipped with an ejector mechanism 48. The ejector mechanism 48 is a device for taking out moldings from the movable mold 32. The ejector mechanism 48 is equipped with a power transmission device 100B. A drive source (ejector motor) 102B, a pulley 104B, a pulley 106B, and a belt 108B are provided on the power transmission device 100B. The belt 108B is wound around the pulley 104B and the pulley 106B, and transmits a rotational force of the pulley 104B to the pulley 106B. Driving of the drive source 102B can be controlled by the control device 18.

Rotational movement of the drive source 102B is transmitted to a ball screw mechanism 54 that is connected to an ejector pin 52. The rotational movement transmitted from the drive source 102B is converted by the ball screw mechanism 54 into movement in a forward/rearward direction of the ejector pin 52. In this manner, the ejector pin 52 can be moved forward and rearward with respect to the moving platen 24. By the ejector pin 52 being moved to the side of the moving platen 24, moldings are ejected from the movable mold 32 and taken out.

An information acquisition unit 74B is connected to the drive source 102B. A signal corresponding to the torque of the drive source 102B, and more specifically, for example, a signal indicative of a magnitude of the current supplied to the drive source 102B, is input to the information acquisition unit 74B. The information acquisition unit 74B supplies the information indicative of the torque of the drive source 102B to the control device 18.

The injection device 14 is equipped with a nozzle 56, a cylinder 58, a screw 60, a hopper 62, and a heater 64. The nozzle 56 is provided at a distal end of the cylinder 58. The cylinder 58 is constituted by a hollow member. A screw 60 is inserted through the interior of the cylinder 58. The cylinder 58 and the screw 60 extend along the opening and closing directions of the mold 30. The hopper 62 is connected to the cylinder 58. The hopper 62 serves to introduce a resin material into the cylinder 58. In the case that the resin material, which is introduced from the hopper 62, is in the form of pellets, the resin material is melted by the heater 64.

The injection device 14 includes a resin supplying mechanism 66, and an injection mechanism 68. The resin supplying mechanism 66 delivers the resin material inside the cylinder 58 toward the nozzle 56 of the cylinder 58. The injection mechanism 68 injects the resin material toward the mold 30. The resin supplying mechanism 66 is equipped with a power transmission device 100C. The power transmission device 100C comprises a drive source (a motor for rotational movement) 102C, a pulley 104C, a pulley 106C, and a belt 108C. The belt 108C is wound around the pulley 104C and the pulley 106C, and transmits a rotational force of the pulley 104C to the pulley 106C. Driving of the drive source 102C can be controlled by the control device 18.

Rotational movement of the drive source 102C is transmitted to a bush 72 that is connected to the screw 60, and as a result, the screw 60 is rotated about its axis. When the screw 60 rotates about its axis, the resin material inside the cylinder 58 is delivered toward the nozzle 56 of the cylinder 58.

An information acquisition unit 74C is connected to the drive source 102C. A signal corresponding to the torque of the drive source 102C, and more specifically, for example, a signal indicative of a magnitude of the current supplied to the drive source 102C, is input to the information acquisition unit 74C. The information acquisition unit 74C supplies the information indicative of the torque of the drive source 102C to the control device 18.

The injection mechanism 68 is equipped with a power transmission device 100D. The power transmission device 100D comprises a drive source (a motor for linear movement) 102D, a pulley 104D, a pulley 106D, and a belt 108D. The belt 108D is wound around the pulley 104D and the pulley 106D, and transmits a rotational force of the pulley 104D to the pulley 106D. Driving of the drive source 102D can be controlled by the control device 18.

Rotational movement of the drive source 102D is converted by a ball screw mechanism 78 into movement of the bush 72 in the forward/rearward direction, and is transmitted to the screw 60. Consequently, the screw 60 moves in the axial direction. Due to such movement of the screw 60 toward the nozzle 56, the resin material inside the cylinder 58 is injected from the nozzle 56 toward the mold 30.

An information acquisition unit 74D is connected to the drive source 102D. A signal corresponding to the torque of the drive source 102D, and more specifically, for example, a signal indicative of a magnitude of the current supplied to the drive source 102D, is input to the information acquisition unit 74D. The information acquisition unit 74D supplies the information indicative of the torque of the drive source 102D to the control device 18.

Although in FIG. 1, the information acquisition units 74A to 74D that acquire information indicative of the torques of the drive sources 102 are illustrated, the information acquisition units 74 provided in the injection molding machine 10 are not limited to this feature. Position information, pressure information, and the like, which are acquired using non-illustrated sensors or the like, can be appropriately acquired using non-illustrated information acquisition units 74. The information acquisition units 74 supply such acquired information to the control device 18.

The control device 18 administers the control of the injection molding machine 10 as a whole. The control device 18 is equipped with a computation unit 114 and a storage unit 116. The computation unit 114 may be configured, for example, by a CPU (Central Processing Unit) or the like, although the present invention is not limited to this feature. The storage unit 116 is equipped with a volatile memory and a nonvolatile memory, neither of which are illustrated. As examples of the volatile memory, there may be cited a RAM (Random Access Memory) or the like. As examples of the nonvolatile memory, there may be cited a ROM (Read Only Memory), a flash memory, or the like. Programs, data, tables 138A, 138B and the like may be stored in the storage unit 116.

The computation unit 114 is equipped with an acquisition unit 120, a control unit 129, and a display control unit 122. The acquisition unit 120, the control unit 129, and the display control unit 122 can be realized by programs stored in the storage unit 116 being executed by the computation unit 114.

The acquisition unit 120 can acquire information supplied from the information acquisition units 74.

The control unit 129 can supply the information acquired by the acquisition unit 120 to the display control unit 122.

The display control unit 122 can control the display on the display unit 118. The display control unit 122 includes a first display control unit 124, a second display control unit 126, and an image display control unit 128.

The display unit 118 can be constituted, for example, by a liquid crystal display or the like, although the present invention is not limited to this feature. The display unit 118 is equipped with a display screen 130 (see FIG. 2). The display screen 130, for example, is horizontally elongated, but is not necessarily limited to this feature. However, in the case of displaying content for the purpose of displaying time-series data, or content for the purpose of displaying data in accordance with movement in a horizontal direction of the injection molding machine 10, or the like, the display screen 130 is preferably horizontally elongated. A display device 123 is constituted by the display control unit 122 and the display unit 118.

Figure 2:
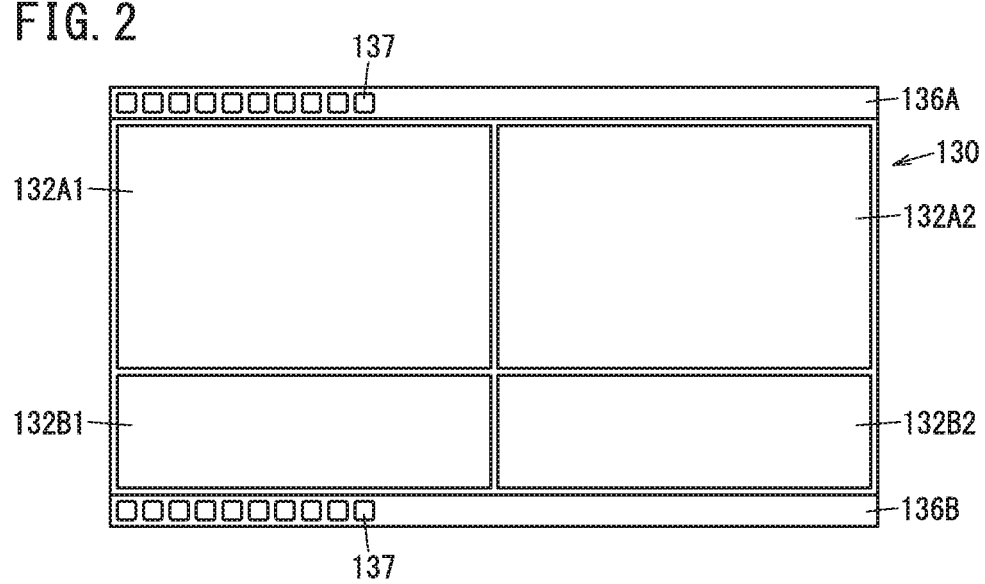
FIG. 2 is a diagram showing an example of a display.

FIG. 2 is a diagram showing an example of a display. An example of a default display is shown in FIG. 2. As shown in FIG. 2, the display screen 130 is divided beforehand, for example, into upper, lower, left, and right sections. Respective areas 132A1, 132A2, 132B1, and 132B2, which are defined by being divided into the upper, lower, left, and right sections, form display areas. Reference numeral 132 is used when describing the display areas in general, whereas reference numerals 132A1, 132A2, 132B1, and 132B2 are used when describing the individual display areas.

The display areas 132A1 and 132A2 are main areas. The display areas 132B1 and 132B2 are sub-areas. In the main area 132A, for example, operation condition settings of the injection molding machine 10, and operation waveforms of the injection molding machine 10, etc., can be displayed. In a sub-area 132B, for example, the positions of the respective axes of the injection molding machine 10, and alarm messages, etc., can be displayed. The size of the sub-areas 132B1 and 132B2 is smaller than the size of the main areas 132A1 and 132A2. Reference numeral 132A is used when describing the main areas in general, whereas reference numerals 132A1 and 132A2 are used when describing the individual main areas. Reference numeral 132B is used when describing the sub-areas in general, whereas reference numerals 132B1 and 132B2 are used when describing the individual sub-areas. The heights of the horizontally adjacent main areas 132A are set equivalently to each other. The heights of the horizontally adjacent sub-areas 132B are set equivalently to each other. The widths of the main area 132A and the sub-area 132B, which are vertically adjacent, are set equivalently to each other. It should be noted that, although two main areas 132A and two sub-areas 132B are illustrated in FIG. 2, the number of the main areas 132A and the number of the sub-areas 132B need not necessarily be limited to this feature.

The display screen 130 further includes icon display areas 136A and 136B. The icon display area 136A is arranged, for example, at an upper end of the display screen 130. The icon display area 136B is arranged, for example, at a lower end of the display screen 130. Reference numeral 136 is used when describing the icon display areas in general, whereas reference numerals 136A and 136B are used when describing the individual icon display areas. A plurality of icons 137 can be displayed in the icon display areas 136. The icons 137, for example, serve for selecting the content to be displayed, however, they are not limited to this feature.

The operation unit 135 can be constituted, for example, by a touch panel, a keyboard, a mouse, or the like, none of which are illustrated. The touch panel may be provided on the display screen 130 of the display unit 118. A user is capable of issuing instructions to the control device 18 by operating the operation unit 135. The user can select an icon 137 displayed in the icon display areas 136 by operating the touch panel, the mouse, or the like, for example. The operation unit 135 may be configured by a non-illustrated mechanical switch (push button). By pressing the mechanical switch, the user can select the displayed content. The mechanical switch may be arranged, for example, on an outer side of the display screen 130.

The first display control unit 124 can perform a control for displaying the selected content in any one of the plurality of display areas 132, without combining the plurality of display areas 132.

The second display control unit 126 can perform a control for displaying content in combined areas 134A, 134B, and 134C, which are configured by combining a plurality of display areas 132 that lie adjacent to each other. Reference numeral 134 is used when describing the combined areas in general, whereas reference numerals 134A, 134B, and 134C are used when describing the individual combined areas.

The storage unit 116 is equipped with the tables 138A and 138B. FIG. 3A and FIG. 3B are diagrams showing examples of such tables. In the table 138A, there are defined selectable content X1 to X4, and non-combined display modes Y1 to Y4 for the display areas 132 in the case that the content X1 to X4 are selected. In the table 138B, there are defined selectable content X5 to X8, and combined display modes Z1 to Z4 for the display areas 132 in the case that the content X5 to X8 are selected. The reference character X is used to describe the content in general, and the reference characters X1 to X8 are used to describe individual instances of the content. Further, the reference character Y is used to describe the non-combined display modes in general, and the reference characters Y1 to Y4 are used to describe individual instances of the non-combined display modes. Further, the reference character Z is used to describe the combined display modes in general, and the reference characters Z1 to Z4 are used to describe individual instances of the combined display modes. It should be noted that, although the selected content is not limited to X1 to X8, in this case, in order to simplify the description, the content X1 to X8 are shown from among a plurality of instances of such content.

As shown in FIG. 3A, the non-combined display mode for the content X1, for example, is Y1. The non-combined display mode Y1 is a mode in which the selected content X is displayed in the main area 132A1 without combining the plurality of display areas 132.

Figure 4:
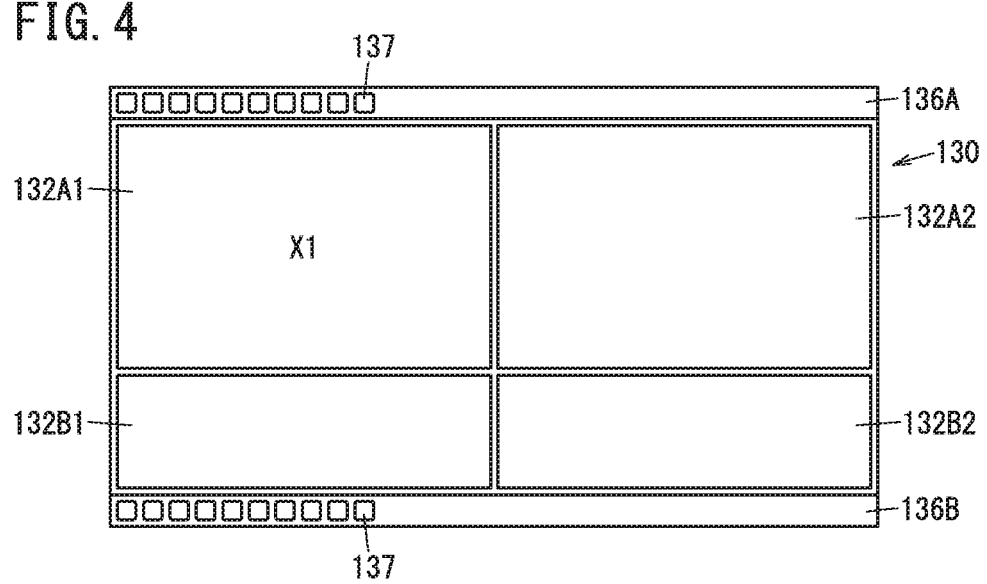
FIG. 4 is a diagram showing an example of a display.

FIG. 4 is a diagram showing an example of a display. FIG. 4 shows an exemplary case in which the selected content X1 is displayed in the main area 132A1 without combining the plurality of display areas 132. In the case that the content X1 is selected, the first display control unit 124 performs a control so that the selected content X1 is displayed in the main area 132A1 without combining the plurality of display areas 132.

As shown in FIG. 3A, the non-combined display mode for the content X2, for example, is Y2. The non-combined display mode Y2 is a mode in which the selected content X is displayed in the main area 132A2 without combining the plurality of display areas 132. In the case that the content X2 is selected, the first display control unit 124 performs a control so that the selected content X2 is displayed in the main area 132A2 without combining the plurality of display areas 132.

As shown in FIG. 3A, the non-combined display mode for the content X3, for example, is Y3. The non-combined display mode Y3 is a mode in which the selected content X is displayed in the sub-area 132B1 without combining the plurality of display areas 132. In the case that the content X3 is selected, the first display control unit 124 performs a control so that the selected content X3 is displayed in the sub-area 132B1 without combining the plurality of display areas 132.

As shown in FIG. 3A, the non-combined display mode for the content X4, for example, is Y4. The non-combined display mode Y4 is a mode in which the selected content X is displayed in the sub-area 132B2 without combining the plurality of display areas 132. In the case that the content X4 is selected, the first display control unit 124 performs a control so that the selected content X4 is displayed in the sub-area 132B2 without combining the plurality of display areas 132.

As shown in FIG. 3B, the combined display mode for the content X5, for example, is Z1. The combined display mode Z1 is a mode in which the content X is displayed in the combined area 134A which is configured by combining a plurality of horizontally adjacent main areas 132A. As the content X5, for example, there may be cited content for the purpose of displaying time-series data, content for the purpose of displaying data in accordance with movement in a horizontal direction of the injection molding machine 10, or the like. As an example of the time-series data, there may be cited time-series data indicative of torques of the drive sources 102. Further, as an example of the time-series data, there may be cited time-series data indicative of a rotational speed of the screw 60. Further, as the time-series data, there may be cited time-series data indicative of a pressure applied to the resin inside the cylinder 58. Further, as the data in accordance with movement in a horizontal direction of the injection molding machine 10, there may be cited data indicative of a position of the screw 60 in the forward/rearward direction.

Figure 5:
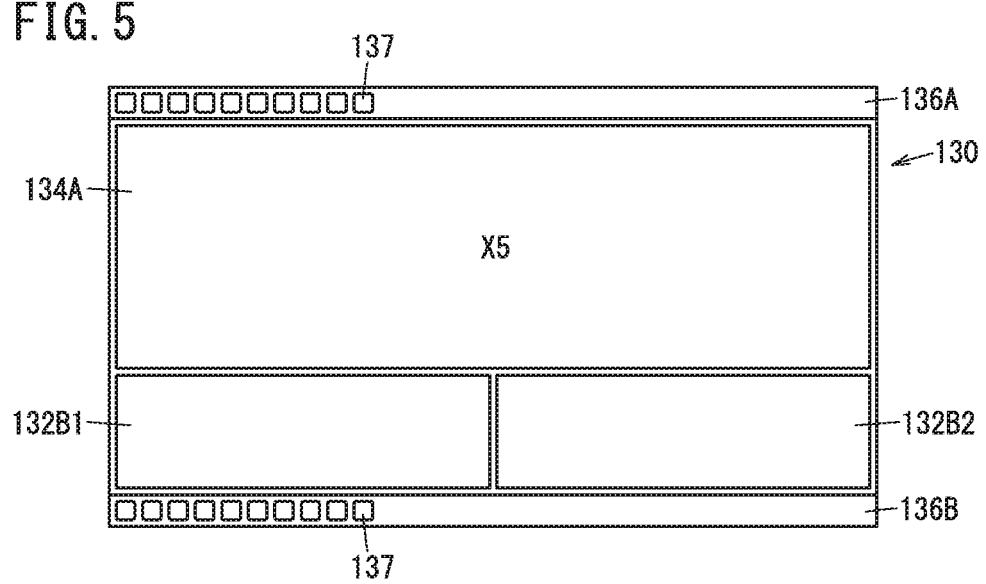
FIG. 5 is a diagram showing an example of a display.

FIG. 5 is a diagram showing an example of a display. In FIG. 5, there is shown an example of a case in which the content X5 is displayed in the combined area 134A which is configured by combining a plurality of horizontally adjacent main areas 132A1 and 132A2. In the case that the content X5 is selected, the second display control unit 126 performs a control so that the content X5 is displayed in the combined area 134A which is configured by combining the horizontally adjacent main areas 132A1 and 132A2.

Figure 6:
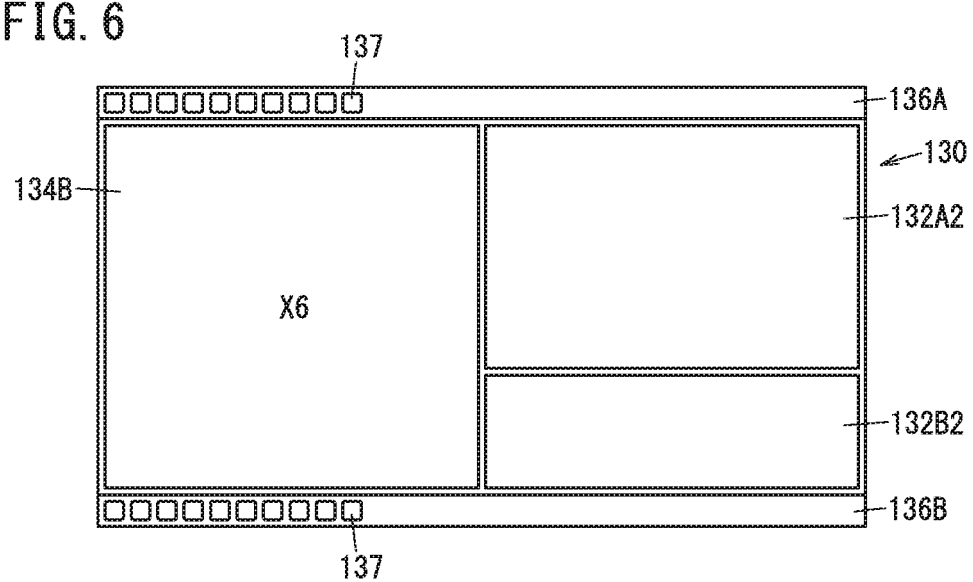
FIG. 6 is a diagram showing an example of a display.

As shown in FIG. 3B, the combined display mode for the content X6, for example, is Z2. The combined display mode Z2 is a mode in which the content X is displayed in the combined area 134B which is configured by combining the main area 132A and the sub-area 132B that are vertically adjacent. FIG. 6 is a diagram showing an example of a display. In FIG. 6, there is shown an example of a case in which the content X6 is displayed in the combined area 134B which is configured by combining the main area 132A1 and the sub-area 132B1 that are vertically adjacent. In the case that the content X6 is selected, the second display control unit 126 performs a control so that the content X6 is displayed in the combined area 134B which is configured by combining the main area 132A1 and the sub-area 132B1 that are vertically adjacent.

Figure 7:
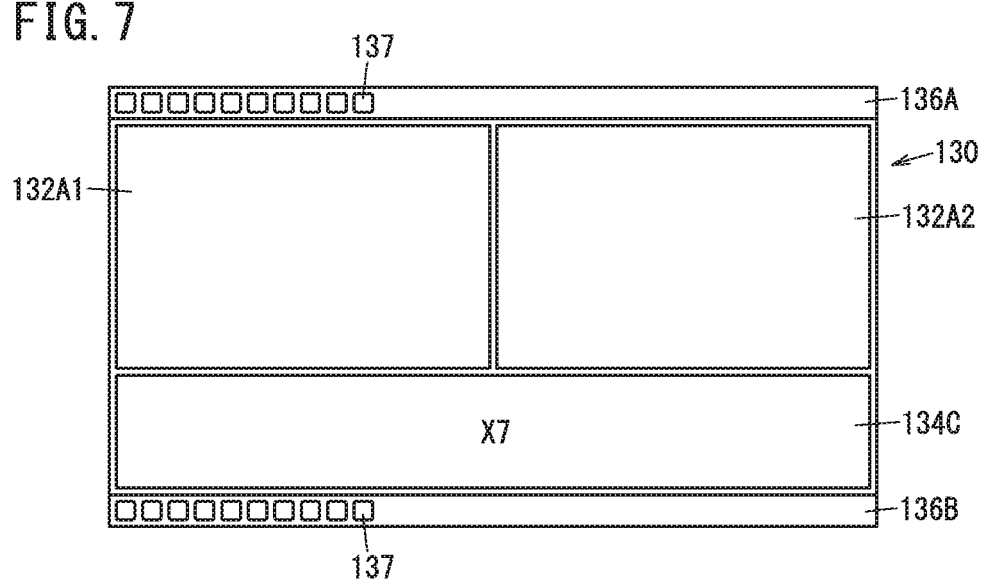
FIG. 7 is a diagram showing an example of a display.

As shown in FIG. 3B, the combined display mode for the content X7, for example, is Z3. The combined display mode Z3 is a mode in which the content X is displayed in the combined area 134C which is configured by combining a plurality of horizontally adjacent sub-areas 132B. FIG. 7 is a diagram showing an example of a display. In FIG. 7, there is shown an example of a case in which the content X7 is displayed in the combined area 134C which is configured by combining a plurality of horizontally adjacent sub-areas 132B1 and 132B2. In the case that the content X7 is selected, the second display control unit 126 performs a control so that the content X7 is displayed in the combined area 134C which is configured by combining the sub-area 132B1 and the sub-area 132B2 that are horizontally adjacent.

Figure 8:
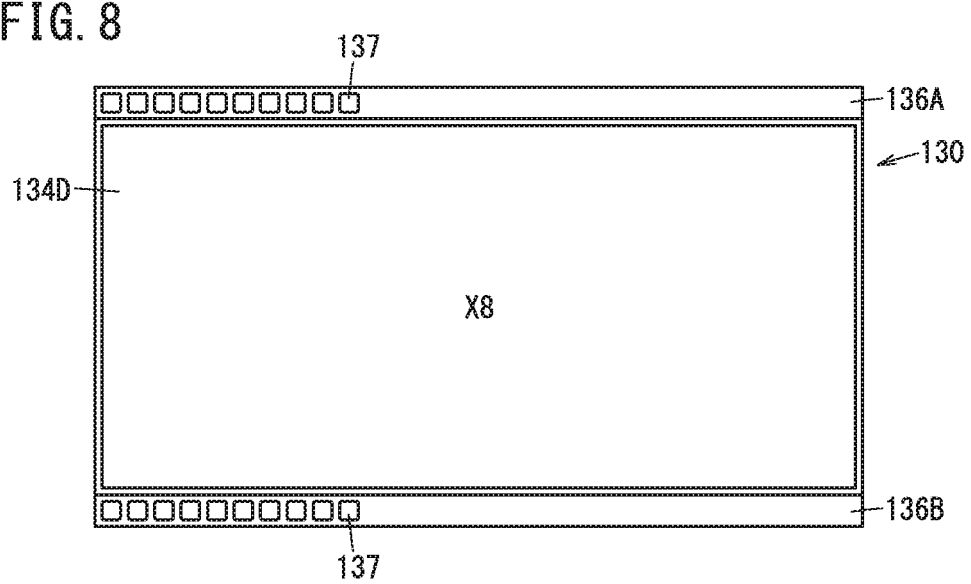
FIG. 8 is a diagram showing an example of a display.

As shown in FIG. 3B, the combined display mode for the content X8, for example, is Z4. The combined display mode Z4 is a mode in which the content X is displayed in the combined area 134D which is configured by combining all of the display areas 132. FIG. 8 is a diagram showing an example of a display. In FIG. 8, there is shown an example of a case in which the content X8 is displayed in the combined area 134D which is configured by combining all of the display areas 132. In the case that the content X8 is selected, the second display control unit 126 performs a control so that the content X8 is displayed in the combined area 134D which is configured by combining all of the display areas 132.

The image display control unit 128 generates a raster signal for the display on the basis of information that is supplied from the first display control unit 124 and the second display control unit 126, and supplies the generated raster signal to the display unit 118. Based on the raster signal supplied from the image display control unit 128, the display unit 118 displays an image or the like on the display screen 130.

In the case that a predetermined operation is performed by the user, in a state in which the content is displayed in one display area 132 among the plurality of display areas 132, the first display control unit 124 can perform the following process. More specifically, together with maintaining a state in which the content is displayed in the one display area 132, hidden content of the content that is displayed in the one display area 132 is displayed in another display area 132 adjacent to the one display area 132. As an example of such a predetermined operation, there may be cited an operation for the purpose of displaying hidden content of the content that is displayed in the one display area 132.

Figure 9A:
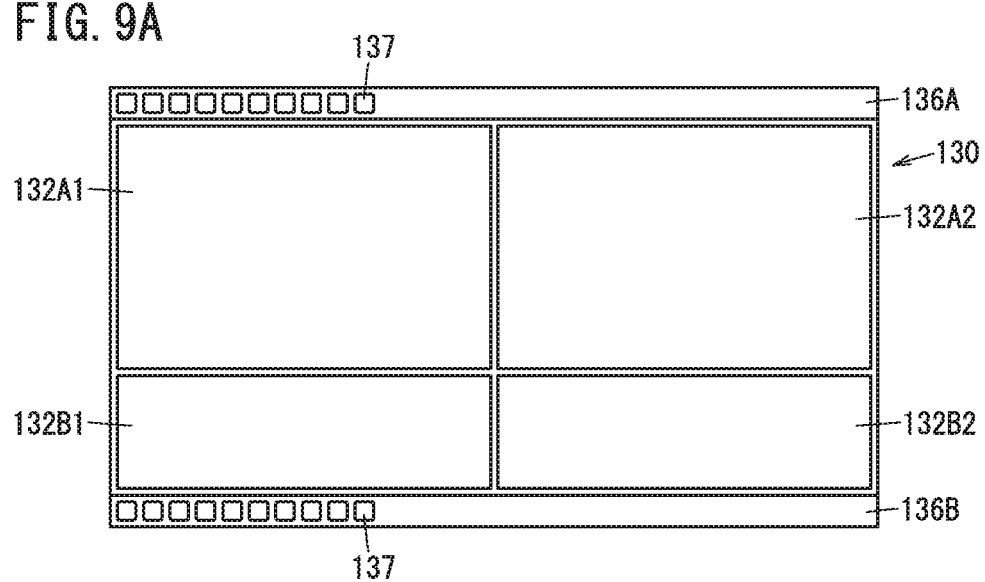
FIG. 9A and FIG. 9B are diagrams showing examples of displays.
Figure 9B:
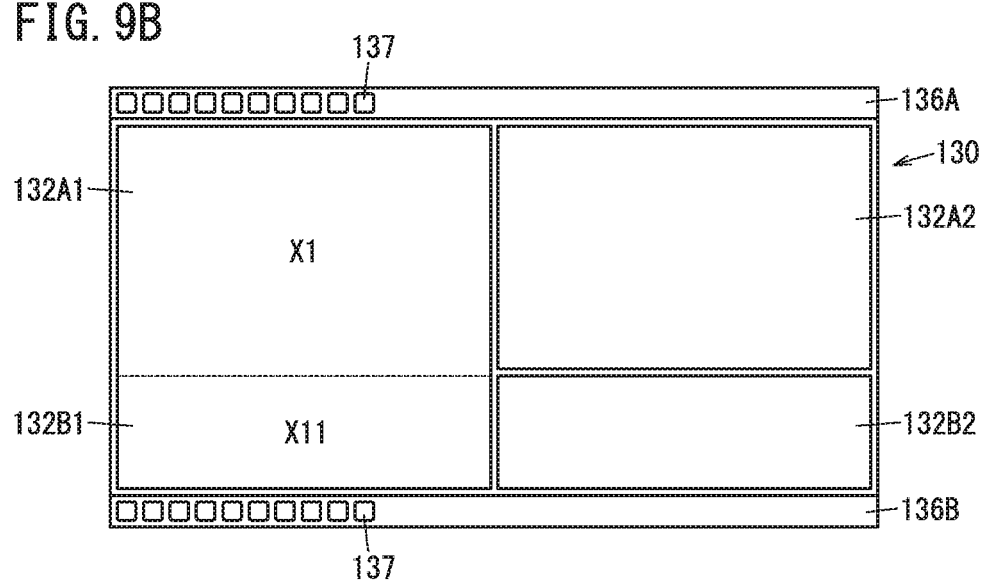

FIG. 9A and FIG. 9B are diagrams showing examples of displays. FIG. 9A shows an example of a display before the predetermined operation is performed. FIG. 9B shows an example of a display after the predetermined operation has been performed. In this instance, an exemplary case will be described in which the content X1 is displayed in the display area 132A1. The non-combined display mode corresponding to the content X1, as has been described above, is Y1. As noted above, the non-combined display mode Y1 is a mode in which the selected content X is displayed in the main area 132A1 without combining the plurality of display areas 132. The control for displaying the content X1 is performed by the first display control unit 124. At a time prior to preforming the predetermined operation, as shown in FIG. 9A, the content X1 is displayed, for example, in the display area 132A1. In the case that the predetermined operation is performed in a state in which the content X1 is displayed in the display area 132A1, the first display control unit 124 performs the following control. More specifically, as shown in FIG. 9B, the first display control unit 124 performs a control so that, together with maintaining a state in which the content X1 is displayed in the display area 132A1, the hidden content X11 of the content X1 is displayed in the display area 132B1.

The first display control unit 124 can enlarge one of the display areas 132 among the plurality of display areas 132 in accordance with an enlargement operation made by the user.

Figure 10A:
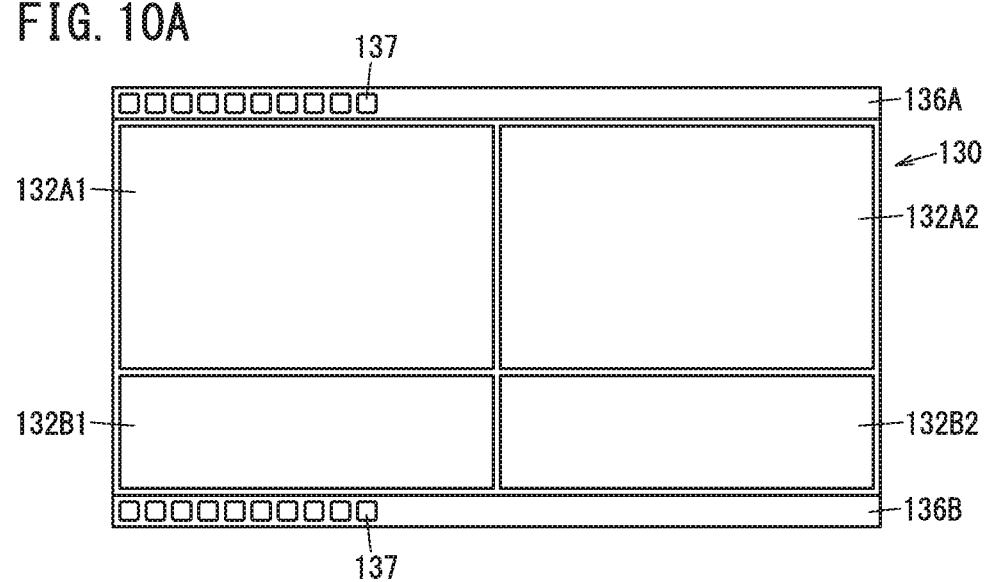
FIG. 10A and FIG. 10B are diagrams showing examples of displays.
Figure 10B:
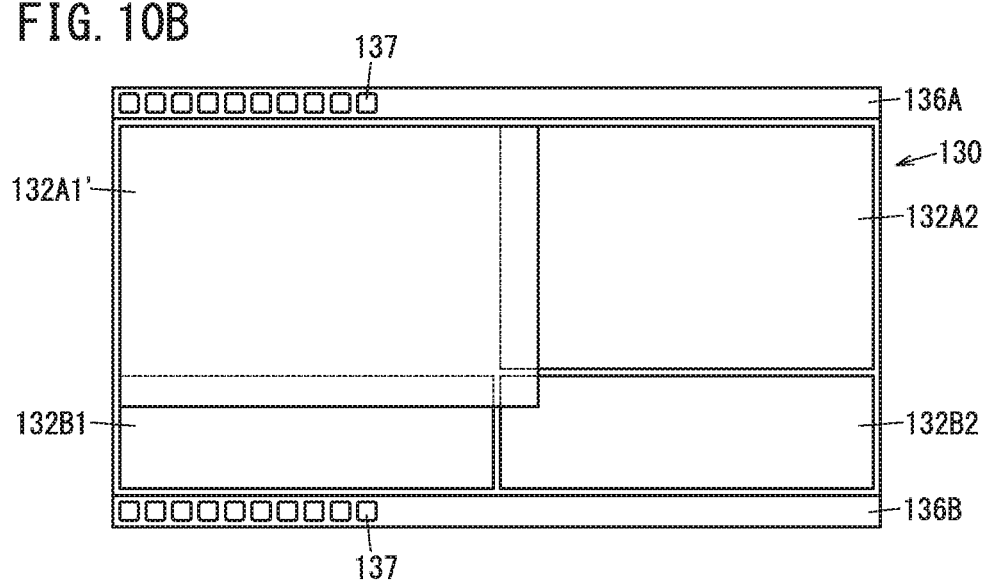

FIG. 10A and FIG. 10B are diagrams showing examples of displays. FIG. 10A shows an example of a display before the enlargement operation is performed on the main area 132A1. FIG. 10B shows an example of a display for a case in which the enlargement operation has been performed on the main area 132A1. In the case that the enlargement operation is performed on the main area 132A1, the first display control unit 124 performs a control so as to enlarge the main area 132A1 in accordance with the enlargement operation, and so that an enlarged main area 132A1' is displayed.

Figure 11A:
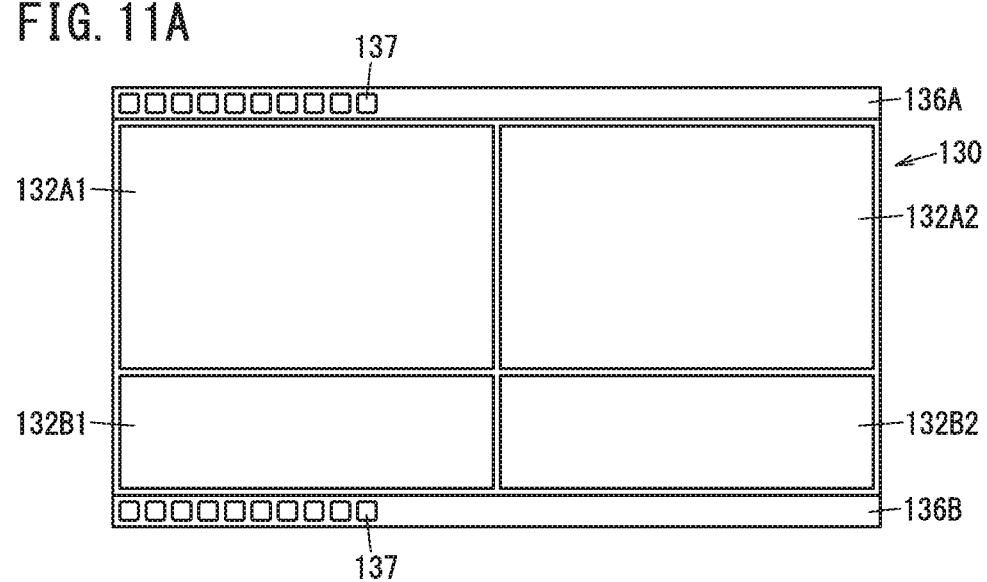
FIG. 11A and FIG. 11B are diagrams showing examples of displays.
Figure 11B:
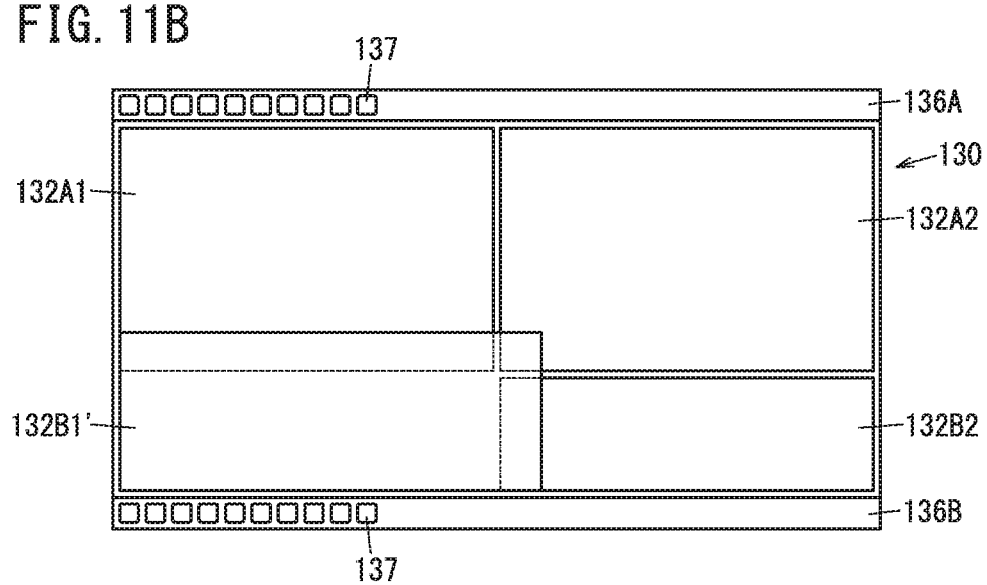

FIG. 11A and FIG. 11B are diagrams showing examples of displays. FIG. 11A shows an example of a display before the enlargement operation is performed on the sub-area 132B1. FIG. 11B shows an example of a display for a case in which the enlargement operation has been performed on the sub-area 132B1. In the case that the enlargement operation is performed on the sub-area 132B1, the first display control unit 124 performs a control so as to enlarge the sub-area 132B1 in accordance with the enlargement operation, and so that an enlarged sub-area 132B1' is displayed.

In the case that one of the display areas 132 is enlarged in response to the enlargement operation made by the user, the first display control unit 124 can additionally display, within the enlarged one display area 132, the content that has not been displayed prior to enlarging the one display area 132.

Figure 12A:
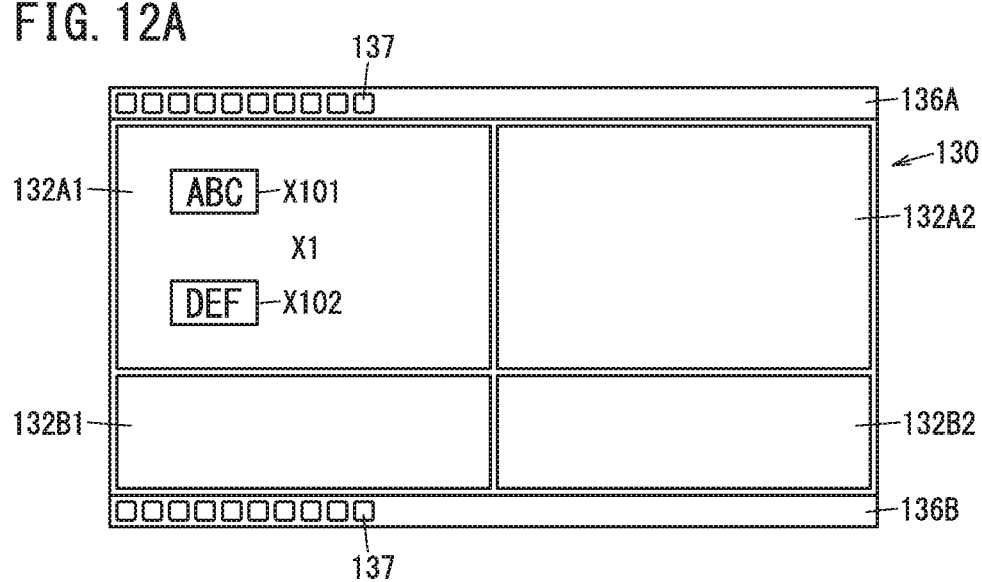
FIG. 12A and FIG. 12B are diagrams showing examples of displays.
Figure 12B:
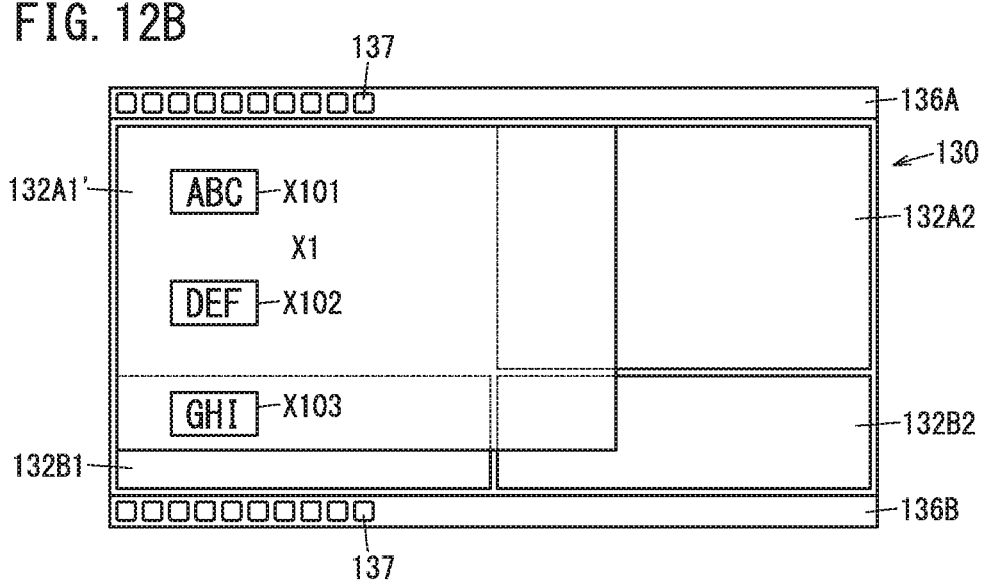

FIG. 12A and FIG. 12B are diagrams showing examples of displays. FIG. 12A shows an example of a display before the enlargement operation is performed on the display areas 132. FIG. 12B shows an example of a display for a case in which the enlargement operation has been performed on the display areas 132. In this instance, an exemplary case will be described in which the enlargement operation is performed on the display area 132A1, in a state in which the content X1 is displayed in the display area 132A1. At a time prior to performing the enlargement operation on the display area 132A1, the content X1 is displayed in the display area 132A1. The content X1 includes partial content X101 and partial content X102. In the case that the enlargement operation is performed on the display area 132A1, the first display control unit 124 performs a control so that the display area 132A1', which is obtained by enlarging the display area 132A1, is displayed. When the display area 132A1 is enlarged, the enlarged display area 132A1' covers a portion of the display area 132A2, a portion of the display area 132B1, and a portion of the display area 132B2. The first display control unit 124 maintains the state in which the content X1 is displayed. More specifically, the first display control unit 124 maintains the state in which the partial content X101 and the partial content X102 are displayed. The font, the size, and the like of the partial content X101 and X102 are not changed before and after enlargement of the display area 132A1. The first display control unit 124 performs a control so that the content X103, which was not displayed prior to enlargement of the display area 132A1, is additionally displayed in the enlarged display area 132A1'. In the case that the size of the display area 132A1 is returned to the size prior to enlargement thereof, the display is returned to the state shown in FIG. 12A. The first display control unit 124 maintains the state in which the content X1 is displayed. More specifically, the first display control unit 124 maintains the state in which the partial content X101 and the partial content X102 are displayed. The first display control unit 124 performs a control so that the content X103 is not displayed within the display area 132A1.

In the case that the one display area 132 is enlarged in response to the enlargement operation made by the user, the first display control unit 124 can display the content in an enlarged manner.

Figure 13A:
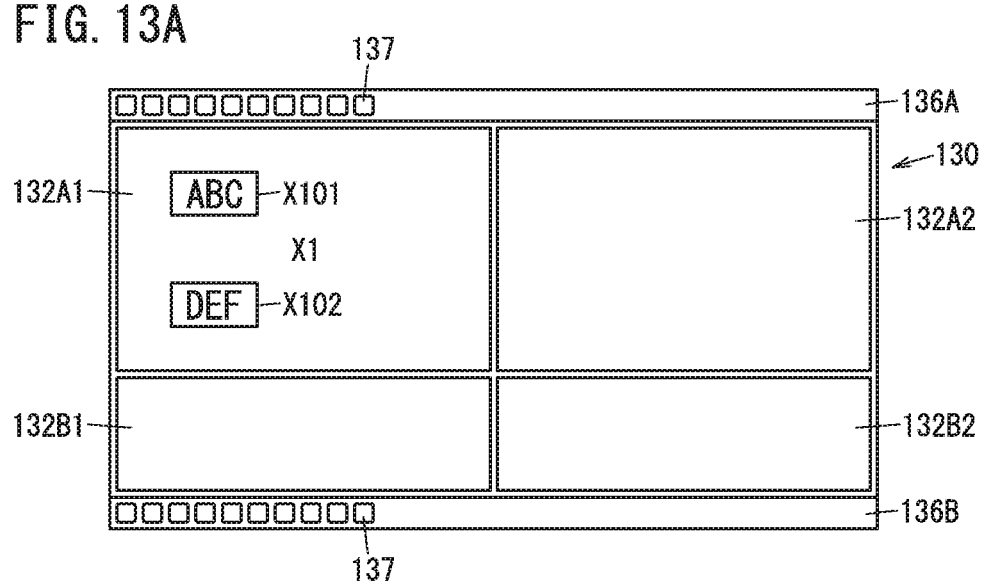
FIG. 13A and FIG. 13B are diagrams showing examples of displays.
Figure 13B:
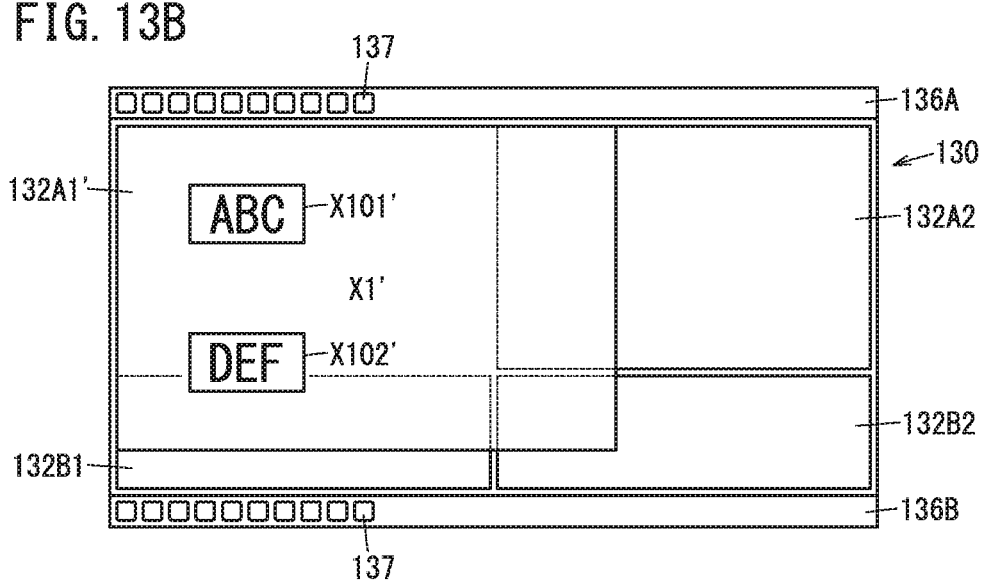

FIG. 13A and FIG. 13B are diagrams showing examples of displays. FIG. 13A shows an example of a display before the enlargement operation is performed on the display areas 132. FIG. 13B shows an example of a display for a case in which the enlargement operation has been performed on the display areas 132. In this instance, an exemplary case will be described in which the enlargement operation is performed on the display area 132A1, in a state in which the content X1 is displayed in the display area 132A1. At a time prior to performing the enlargement operation on the display area 132A1, the content X1 is displayed in the display area 132A1. The content X1 is configured by the partial content X101 and the partial content X102. In the case that the enlargement operation is performed on the display area 132A1, the first display control unit 124 performs a control so that the display area 132A1', which is obtained by enlarging the display area 132A1, is displayed. When the display area 132A1 is enlarged, the enlarged display area 132A1' covers a portion of the display area 132A2, a portion of the display area 132B1, and a portion of the display area 132B2. The first display control unit 124 displays the content X1', which is obtained by enlarging the content X1, within the enlarged display area 132A1'. More specifically, the first display control unit 124 performs a control so that the enlarged partial content X101' and the enlarged partial content X102' are displayed within the enlarged display area 132A1'. The first display control unit 124 performs a control so that the partial content X101' and X102', which are obtained by increasing the sizes of the partial content X101 and X102, are displayed within the display area 132A1' without changing the font. In the case that the size of the display area 132A1 is returned to the size prior to being enlarged, the display is returned to the state shown in FIG. 13A. The first display control unit 124 performs a control so that the content X1 prior to being enlarged is displayed within the display area 132A1. More specifically, the first display control unit 124 performs a control so that the partial content X101 and the partial content X102 are displayed within the display area 132A1 at the size prior to being enlarged.

In the foregoing manner, according to the present embodiment, the content can be displayed in the combined areas 134 which are configured by combining the plurality of display areas 132 that lie adjacent to each other. Therefore, according to the present embodiment, it is possible to provide the display device 123 for the injection molding machine 10 which is capable of realizing a satisfactory display in accordance with the content to be displayed.

Modified Embodiments

Although a preferred embodiment of the present invention has been described above, the present invention is not limited to the above-described embodiment, and various modifications can be made thereto within a range that does not depart from the essence and gist of the present invention.

Figure 14A:
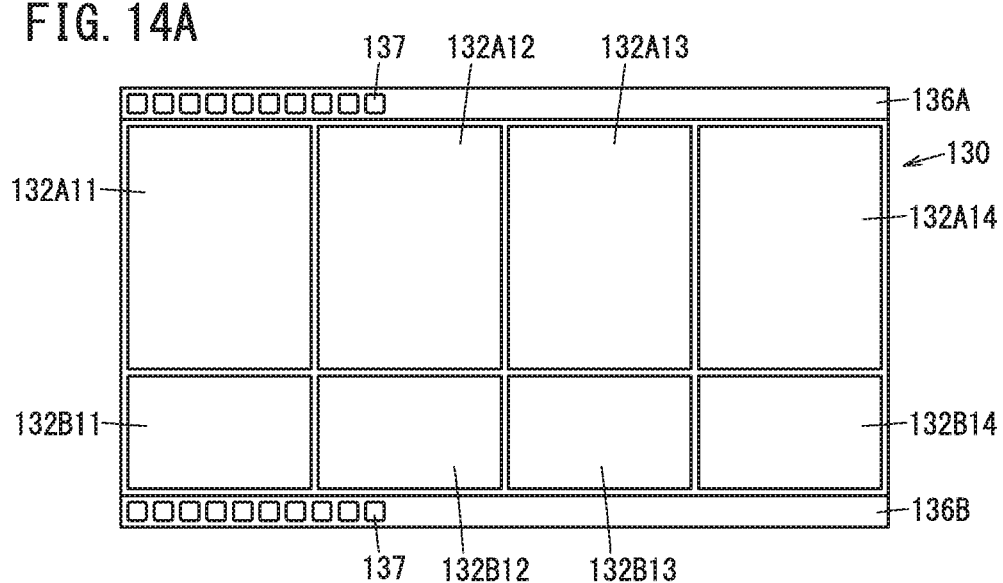
FIG. 14A and FIG. 14B are diagrams showing examples of displays.
Figure 14B:
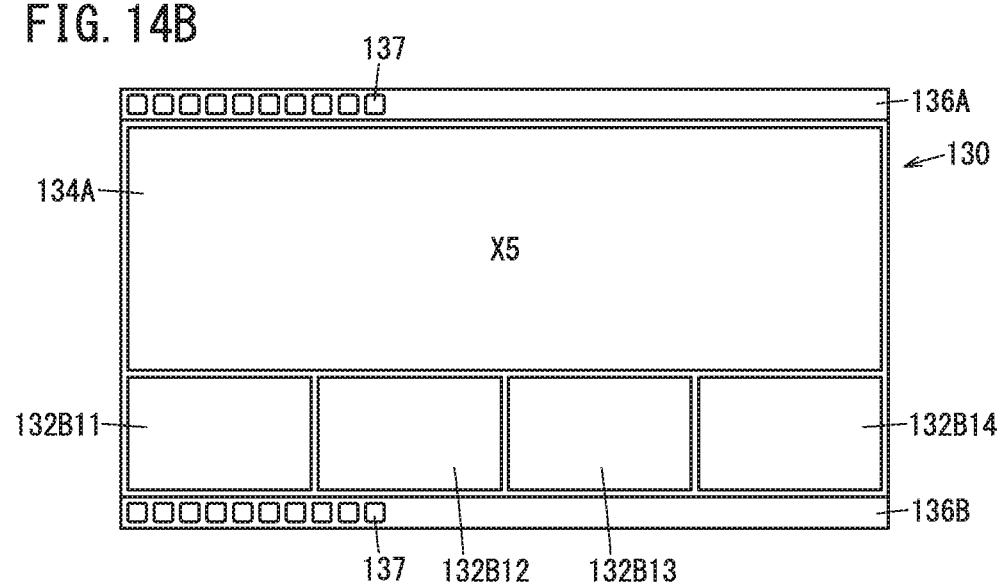

For example, in the above-described embodiment, although an exemplary case has been described in which the combined area 134A is configured by combining two of the main areas 132A, the present invention is not limited to this feature. FIG. 14A and FIG. 14B are diagrams showing examples of displays. FIGS. 14A and 14B show an example of a case in which four main areas 132A11, 132A12, 132A13, and 132A14, and four sub-areas 132B11, 132B12, 132B13, and 132B14 are provided. FIG. 14A shows an example of a display before the content X5 is selected. FIG. 14B shows an example of a display for a case in which the content X5 has been selected. As shown in FIG. 14B, the content X5 can be displayed in the combined area 134A, which is obtained by combining the four main areas 132A11 to 132A14.

For example, in the above-described embodiment, although an exemplary case has been described in which the combined area 134C is configured by combining two of the sub-areas 132B, the present invention is not limited to this feature. FIG. 15A and FIG. 15B are diagrams showing examples of displays. FIGS. 15A and 15B show an example of a case in which four main areas 132A11, 132A12, 132A13, and 132A14, and four sub-areas 132B11, 132B12, 132B13, and 132B14 are provided. FIG. 15A shows an example of a display before the content X7 is selected. FIG. 15B shows an example of a display for a case in which the content X7 has been selected. As shown in FIG. 15B, the content X7 can be displayed in the combined area 134C, which is obtained by combining the four sub-areas 132B11 to 132B14.

The above-described embodiments can be summarized in the following manner.

The display device (123) for the injection molding machine (10) is a display device for an injection molding machine configured to control a display on the display unit (118), wherein, on the display unit, a plurality of display areas (132A1, 132A2, 132B1, 132B2) are provided beforehand by dividing the display screen (130) into upper, lower, left, and right sections, the display device comprising the first display control unit (124) that displays the content (X1 to X4) in any one of the plurality of display areas, without combining the plurality of display areas, and the second display control unit (126) that displays the content (X5 to X8) in the combined area (134A to 134D) configured by combining a plurality of display areas that lie adjacent to each other.

There may further be provided the storage unit (116) which stores the table (138B) in which the combined display mode for the selected content is determined beforehand, wherein the second display control unit may display the content in the combined area which is configured by combining a plurality of display areas in the combined display mode (Z1 to Z4) according to the content (X5 to X8) that is selected.

The plurality of display areas may include the plurality of main areas (132A1, 132A2), and the plurality of sub-areas (132B1, 132B2), and the size of the sub-areas may be smaller than the size of the main areas.

The second display control unit may be configured in a manner so as to be capable of displaying the content (X5, X7) in the combined area (134A, 134C) which is configured by combining a plurality of horizontally adjacent display areas. In accordance with such a configuration, it is possible to satisfactorily display the time-series data, the data in accordance with movement in the horizontal direction, or the like.

The second display control unit may be configured in a manner so as to be capable of displaying the content (X6) in the combined area (134B) which is configured by combining a plurality of vertically adjacent display areas.

The display screen may be a horizontally elongated display screen, and in the case that the content for displaying the time series data, or the content for displaying the data in accordance with movement in a horizontal direction is selected, the second display control unit may display the selected content in the combined area which is configured by combining a plurality of horizontally adjacent display areas. In accordance with such a configuration, it is possible to satisfactorily display the time-series data, the data in accordance with movement in the horizontal direction, or the like.

In the case that a predetermined operation is performed by the user in a state in which the content (X1) is displayed in one display area (132A1) among the plurality of display areas, the first display control unit may maintain a state in which the content is displayed in the one display area, and also display, in the other display area (132B1) adjacent to the one display area, the hidden content (X11) of the content that is displayed in the one display area.

The first display control unit may enlarge one display area among the plurality of display areas in accordance with an enlargement operation made by the user.

In the case that the one display area (132A1) is enlarged in response to the enlargement operation made by the user, the first display control unit may additionally display, within the enlarged one display area (132A1'), the content (X103) that has not been displayed prior to enlarging the one display area.

In the case that the one display area (132A1) is enlarged in response to the enlargement operation made by the user, the first display control unit may display the content (X1') in an enlarged manner.

What is claimed is:

1. A display device for an injection molding machine configured to control a display, wherein on the display, a plurality of display areas are provided beforehand by dividing a display screen into upper, lower, left, and right sections, the display device comprising:
a processor configured to:
 display content in at least one display area of a first set of at least two display areas of the plurality of display areas, without merging the first set of at least two display areas; and
 display content in a merged area configured by merging a second set of at least two display areas of the plurality of display areas that lie adjacent to each other, wherein the first set of at least two display areas and the merged area are displayed simultaneously on the display; and a memory configured to store a table in which a merged display mode for selected content is determined beforehand, wherein the processor is configured to display the content in the merged area by merging the second set of at least two display areas according to the content that is selected.

2. The display device for an injection molding machine according to claim 1, wherein:

the plurality of display areas include a plurality of main areas, and a plurality of sub-areas; and a size of the sub-areas is smaller than a size of the main areas.

3. The display device for an injection molding machine according to claim 1, wherein the second set of at least two display areas are horizontally adjacent to one another.

4. The display device for an injection molding machine according to claim 1, wherein the second set of at least two display areas are vertically adjacent to one another.

5. The display device for an injection molding machine according to claim 1, wherein:

the display screen is a horizontally elongated display screen; and the processor is configured to, in a case that content for displaying time series data or content for displaying data in accordance with movement in a horizontal direction is selected, display the selected content in the merged area, the second set of at least two display areas are horizontally adjacent to one another.

6. The display device for an injection molding machine according to claim 1, wherein the processor is configured to, in a case that a predetermined operation is performed by a user in a state in which the content is displayed in one display area among the plurality of display areas, maintain a state in which the content is displayed in the one display area, and also display, in another display area adjacent to the one display area, hidden content of the content that is displayed in the one display area.

7. The display device for an injection molding machine according to claim 1, wherein the processor is configured to enlarge one display area among the plurality of display areas in accordance with an enlargement operation made by a user.

8. The display device for an injection molding machine according to claim 7, wherein the processor is configured to, in a case that the one display area is enlarged in response to the enlargement operation made by the user, additionally display, within the enlarged one display area, content that has not been displayed prior to enlarging the one display area.

9. The display device for an injection molding machine according to claim 7, wherein the processor is configured to, in a case that the one display area is enlarged in response to the enlargement operation made by the user, display the content in an enlarged manner.

* * * * *